United States Patent [19]

Costa

[11] 4,441,408

[45] Apr. 10, 1984

[54] MACHINE FOR FORMING CROISSANTS AND THE LIKE CONFECTIONERY PRODUCTS

[76] Inventor: Maurizio D. Costa, Via Trento, 36, 20090 Cesano Boscone (Milano), Italy

[21] Appl. No.: 374,432

[22] Filed: May 3, 1982

[30] Foreign Application Priority Data

Jan. 26, 1982 [IT] Italy .............................. 19310 A/82

[51] Int. Cl.³ .................. A21C 9/08; A21C 11/10; A21J 11/00
[52] U.S. Cl. ................................ 99/450.2; 99/450.1; 425/112; 425/305.1
[58] Field of Search ............... 99/352, 353, 355, 356, 99/443 R, 443 C, 450.1–450.8, 483; 426/297, 502, 497, 523, 496, 500, 503, 512; 425/371, 305 R, 364 R, 112, 104, 106, 200, 305.1, 362, 297, 298

[56] References Cited

U.S. PATENT DOCUMENTS

| | | | |
|---|---|---|---|
| 3,946,656 | 3/1976 | Hai | 99/450.6 |
| 4,034,119 | 7/1977 | Kanbe et al. | 99/355 X |
| 4,109,569 | 8/1978 | Kemper | 99/443 C |

Primary Examiner—Timothy F. Simone
Attorney, Agent, or Firm—Bucknam and Archer

[57] ABSTRACT

The machine comprises a dough flattening out station, a puff-pastry cutting station, a cut puff-pastry triangle spacing and orienting station, a triangle aligning station and a forming station, wherein a plurality of conveyor apparatus are provided effective to convey baking pans under the forming station, in such a way as to cause the pastry pieces to orderly fall into shaped recesses formed in the pans.

The machine further comprises a mechanical type of device effective to control the falling of the formed pastry pieces on the pans and a rotating brush device for bending the pieces according to a predetermined curvature.

6 Claims, 9 Drawing Figures

MACHINE FOR FORMING CROISSANTS AND THE LIKE CONFECTIONERY PRODUCTS

BACKGROUND OF THE INVENTION

The present invention relates to an improved machine for forming confectionery products, such as so-called "croissants" and the like.

As it is well known, particularly machines are presently known, used in the confectionery field, effective to carry out, according to a predetermined sequence, the flattening out of the sweet dough, the cutting of the formed puff-pastry into triangles and the subsequent gripping, rotating and spacing of said puff-pastry triangles for forming croissants, brioches and the like confectionery products.

For a more detailed description of such a machine, reference is herein made to a machine, having the hereinabove mentioned operative characteristics, which is described and illustrated in my U.S. Pat. No. 4,375,348, filed on Nov. 1, 1979.

This machine essentially comprises a dough flattening out station, a station for cutting the puff-pastry into triangles, a cut puff-pastry triangle spacing and orienting station, a triangle aligning station and a forming station.

However, in the machine of the said Patent Specification, the cut puff-pastry triangles, after suitable locating and rolling up operations, freely fall on an output conveyor belt.

This fact requires a subsequent manual transferring of the individual formed product pieces, in order to arrange the latter on suitable pans to be sent to the baking oven.

Moreover, the product pieces have to be bent in such a way as to shape these pieces according to the shapes of the seats formed in the pans.

Accordingly, more than one operator are required, in order to carry out simple operations of the repetitive type, thereby negatively adding to the cost of the finished confectionery products.

SUMMARY OF THE INVENTION

Thus, the task of the present invention is to obviate the hereinabove mentioned drawbacks, by providing an improved machine for forming croissants and the like confectionery products wherein the rolled up puff-pastry triangles may freely fall on the baking pans to be conveyed to the baking oven.

Within the scope of the above task, it is a primary object of the present invention to provide an improved machine for forming croissants and the like confectionery products, wherein the rolled up puff-pastry triangles, located on the pans, are automatically subjected to bending operations, thereby assuming a predetermined shape, such as that of a "horned" brioche.

According to one aspect of the present invention the aforesaid task and objects, as well as yet other objects which will become more apparent hereinafter, are achieved by an improved machine for forming croissants and the like, comprising a dough flattening out station, a puff-pastry cutting station, a cut puff-pastry triangle spacing and orienting station and a forming station, characterized in that it further comprises first and second conveyor apparatus, arranged at a right angle to one another, and a third conveyor apparatus aligned with and downstream of said second conveyor apparatus, said conveyor apparatuses being driven alternately and being effective to transfer the baking pans under said forming station, said machine further comprising a mechanical type of device effective to cause the formed pieces to fall on said pans and a rotating brush device for bending the formed pieces according to determined shapes.

BRIEF DESCRIPTION OF THE DRAWINGS

Further characteristics and advantages of the improved machine for forming croissants and the like, according to the present invention, will become more apparent hereinafter from the following detailed description of the improvements brought to the machine itself, with reference to the figures of the accompanying drawings, where.

DESCRIPTION OF THE PREFERRED EMBODIMENTS

Figure 1:
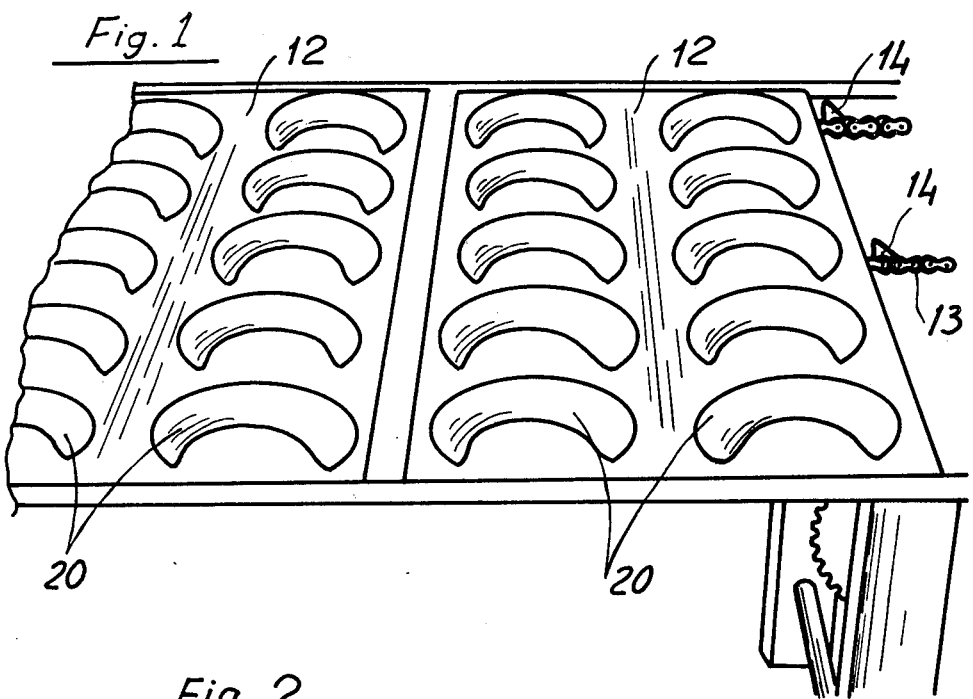
FIG. 1 illustrates the first conveyor apparatus, arranged perpendicularly with respect to the extension of the machine, and carrying a pan pair for baking croissants.
Figure 2:
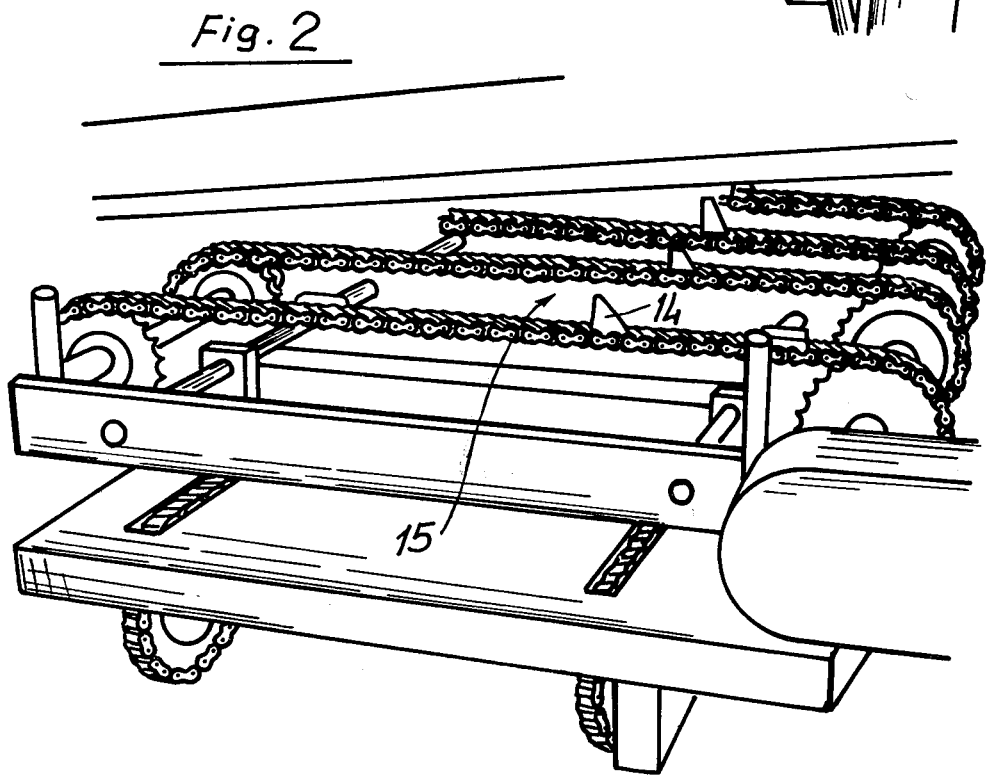
FIG. 2 illustrates the second conveyor apparatus arranged perpendicularly to the first.
Figure 3:
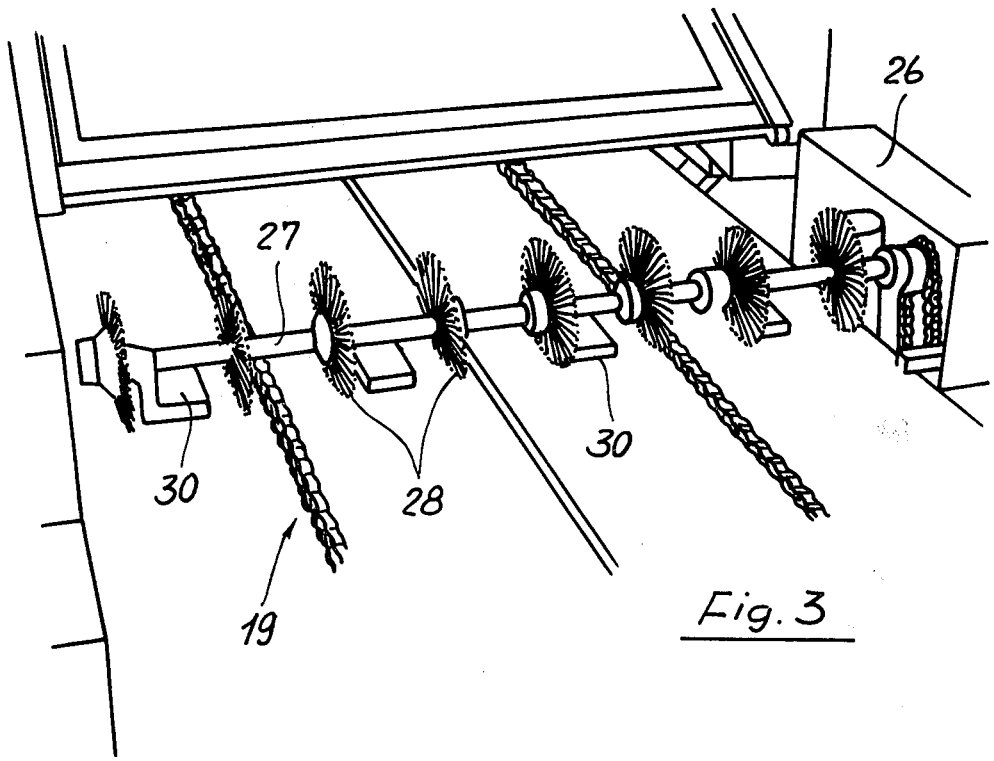
FIG. 3 illustrates an end portion of the third conveyor apparatus, located downstream of the second and underlying the device for bending the formed confectionery pieces fallen by gravity on the baking pans.
Figure 4:
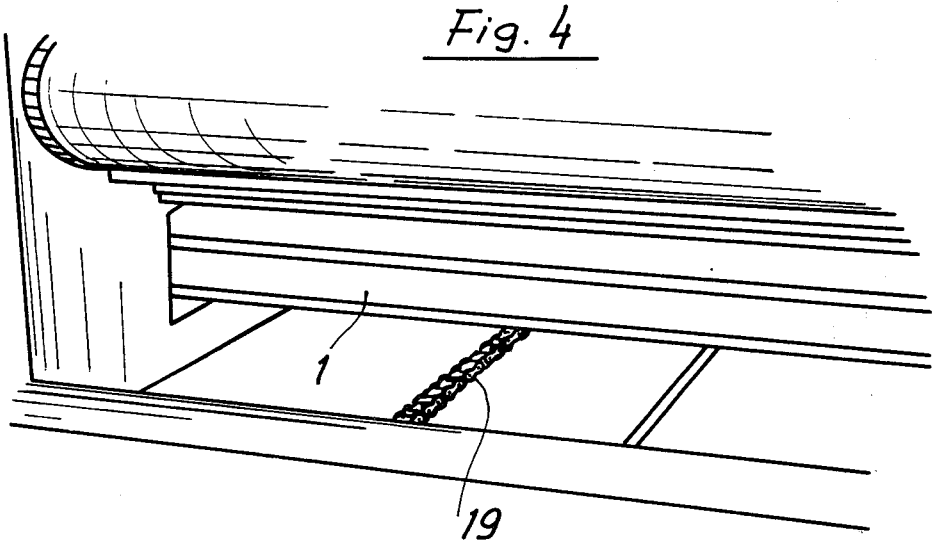
FIG. 4 illustrates the device for holding and successively releasing the pproduct pieces formed on the baking pans.
Figure 5:
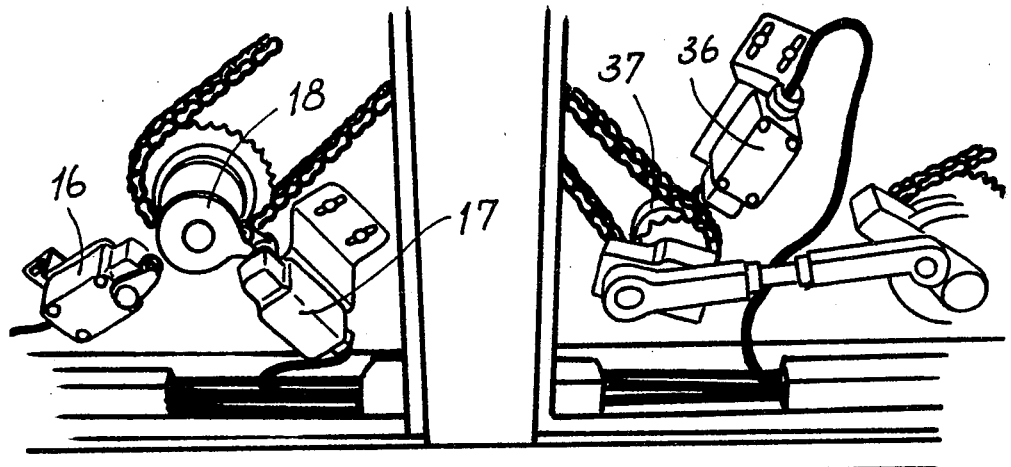
FIG. 5 illustrates microswitches, operated by cam members, controlling the alternate movements of the first and second conveyor apparatuses and of the device for bending the confectionery pieces.
Figure 6:
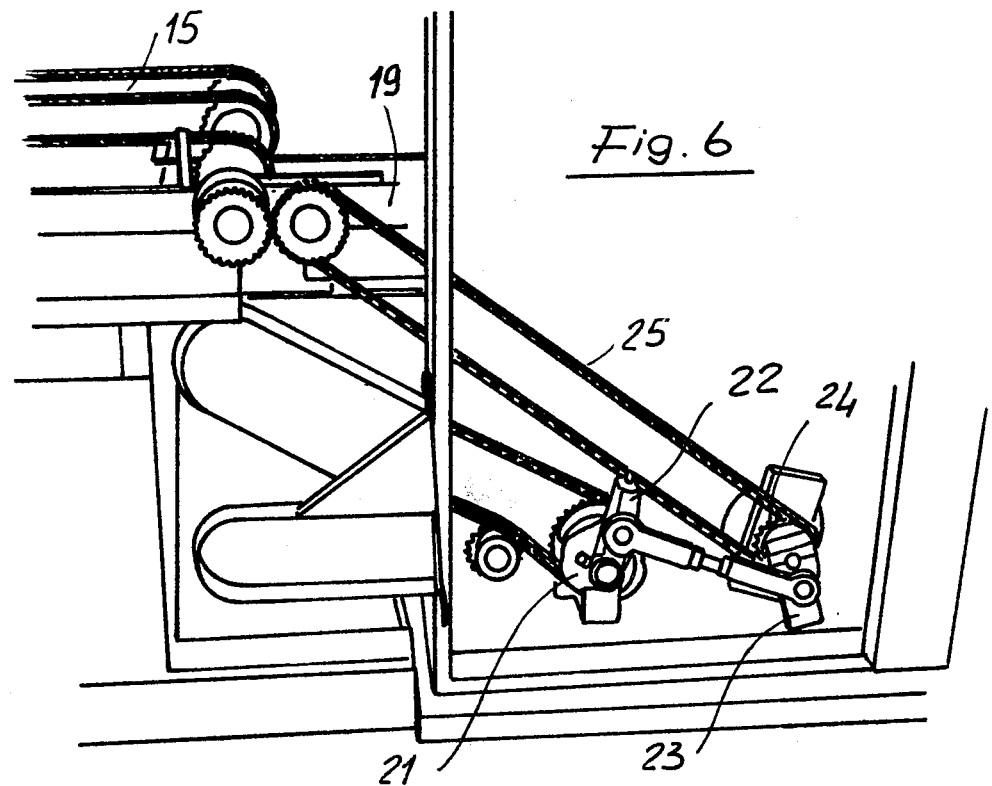
FIG. 6 illustrates the mechanism for controlling the reciprocating movement of the means for moving the third conveyor apparatus.
Figure 7:
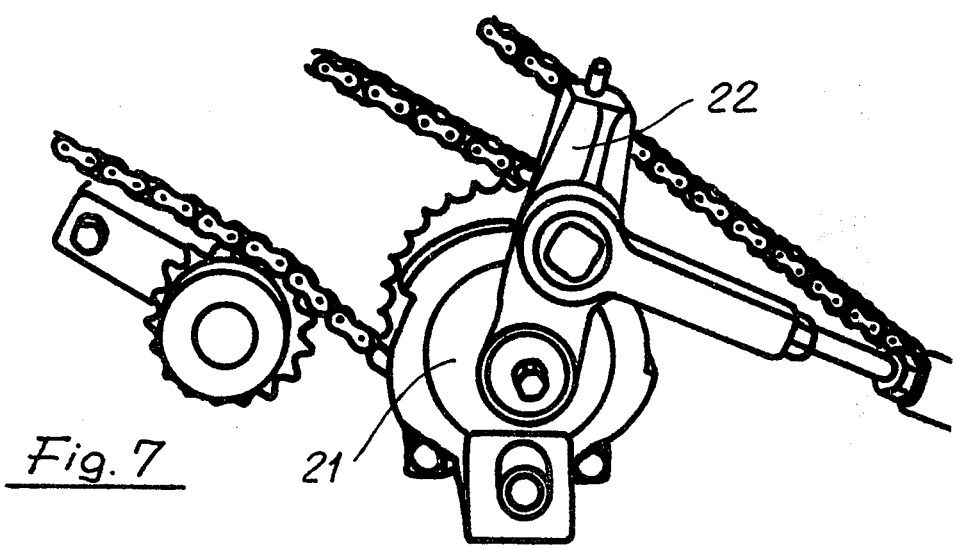
FIG. 7 is a detail view of the ratchet gear effective to provide the cited movement of the third conveyor apparatus.
Figure 8:
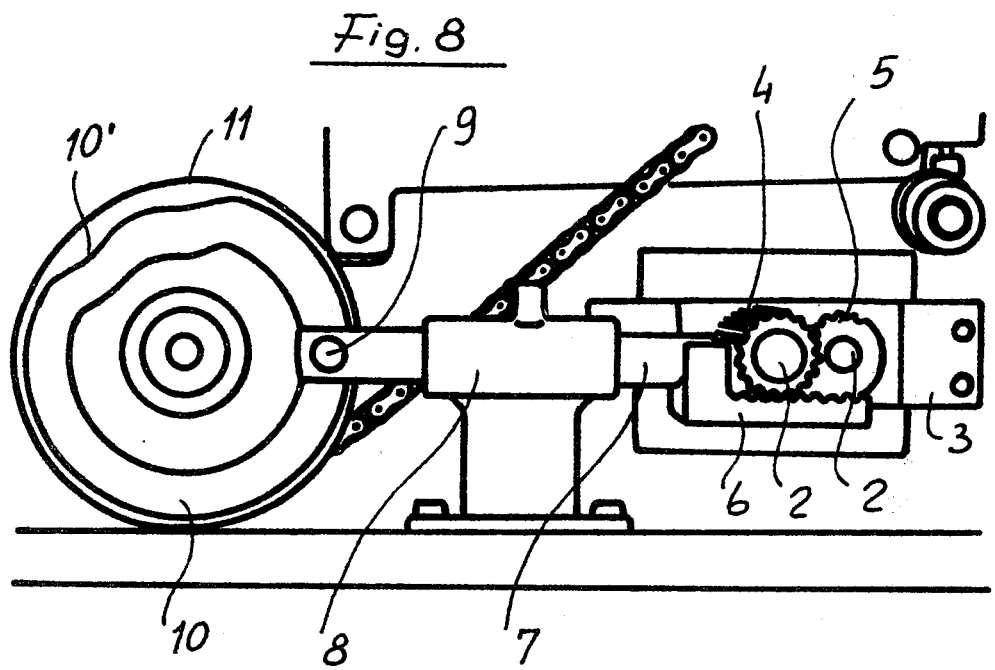
FIG. 8 illustrates the mechanism for controlling said formed confectionery piece holding and releasing device.
Figure 9:
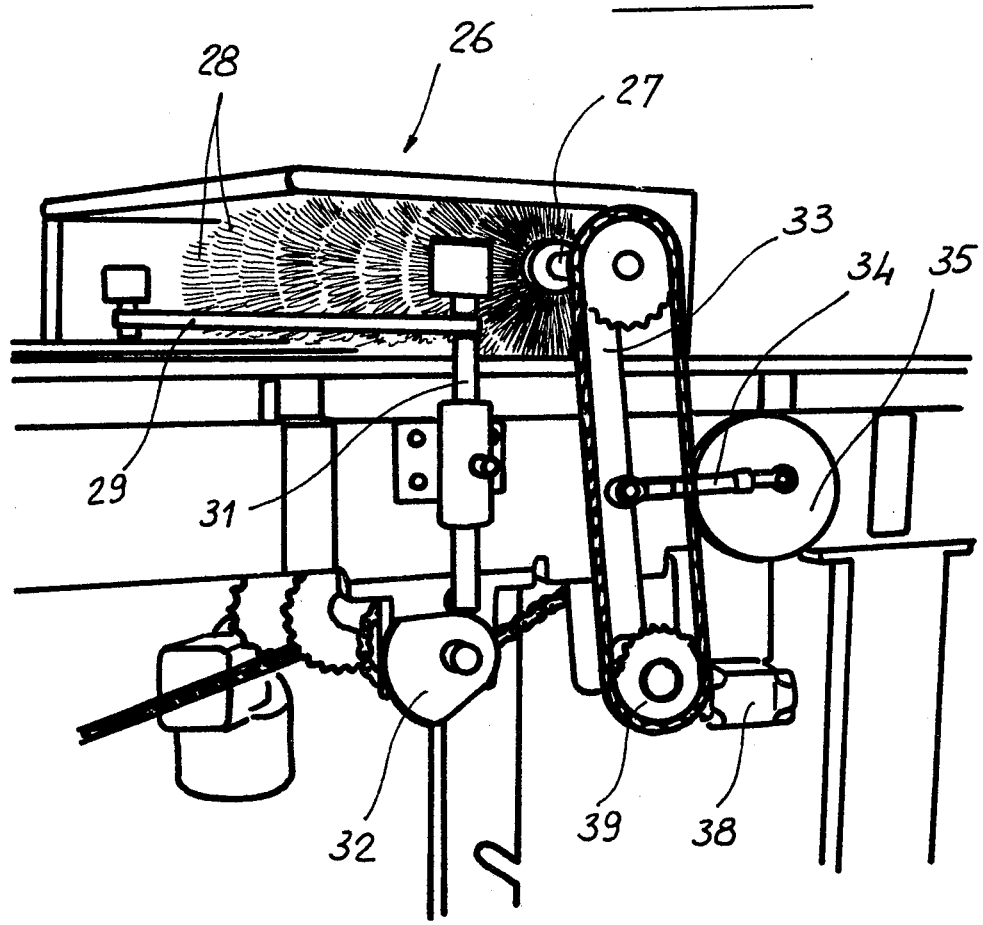
FIG. 9 illustrates the mechanism for controlling the operation of the device for bending the formed confectionery pieces.

With reference to the number references of the figures of the accompanying drawings, the improved machine for forming croissants and the like pastry products according to the present invention, comprises a dough flattening out section or station, a cutting station for cutting the puff-pastry into triangles, a cut puff-pastry triangle spacing and orienting or aligning station and a forming station, that is a station in which the single puff-pastry triangles are rolled up; the operative and constructional features of the mentioned operating stations are broadly illustrated in the above mentioned U.S. Patent Specification.

More specifically, the improved machine according to the present invention comprises a device effective to temporarily hold the plurality of oncoming rolled up pastry pieces aligned across the oncoming direction, in such a way as to synchronize the falling thereof onto corresponding arcuate receiving seats or recesses, which are defined in adjacent relationship on baking pans conveyed by the mentioned third conveyor apparatus.

As it is shown in the figures, the subject holding device comprises two elongated rectangular plates 1, provided with end pins 2, extending in the plate longitudinal direction and rotatively supported parallel to one another by cross-members 3 of the machine.

With two adjacent pins, corresponding pinion gears 4 and 5 are rigid, meshing with one another and having different thicknesses, in such a way that one thereof projects in a greater degree than the other.

With the projecting portion of the greater thickness pignon gear, there engages a rack 6, the latter being formed at one end of a rod 7, slideably coupled to a sleeve member 8.

The opposite end of the mentioned rod carries a pin member 9 which engages, in turn, with a cam profile 10, of suitable extension, defined on a face of a disk member 11, which synchronously rotates with respect to the rollers of the machine forming station.

In the practice, said rectangular plates 1 are normally downwardly converging, in such a way as to present their lower edges adjoining one another and to provide a gap for holding the oncoming formed pieces as the latter are ejected from the forming rollers.

As the pin member 9 of the rod 7 engages the nearly rectilinear section 10' of the cam profile 10, the rack 6 advances, thereby causing said rectangular plates to oppositely rotate: thus, as the plates are in a position in which they lie mutually vertically and parallel, the formed confectionery pieces fall therefrom on the baking pans 12.

The latter are conveyed to the forming station by means of a first 13 conveyor of the driving chain type, which, by means of end members 14 conveys said baking pans onto a second driving chain conveyor 15, arranged perpendicularly to the first conveyor.

These two chain conveyors are effective to move alternately under the control of corresponding microswitches 16 and 17, operated by a suitable disk cam 18.

Downstream of the second conveyor there is located a third chain conveyor 19 which, by means of stepwise movements, drives the pans discharged from said second chain conveyor under the forming station, in such a way as to cause the baking pans to arrange the several rows of adjoining recesses 20 successively under the holding device consisting of the mentioned rectangular plates 1.

The stepwise movement of the third chain conveyor is obtained by means of a ratchet gear 21, the movable arm 22 thereof, on which the ratchet pawl is pivoted, being caused to swing by the cam member 23 which latter, being mounted on the gear wheel 24, is driven by the machine through the chain drive or transmission 25.

On the end portion of the third conveyor there is located a device, indicated overall at 26, having means for bending the rolled up puff-pastry pieces to be located in the shaped recesses 20 of the baking pans.

This bending device or station comprises a shaft 27, extending transverse to the oncoming direction of the pastry pieces and carrying pairs of spaced apart brushes 28, including radially extending bristles, arranged according to a semicircle, and a rod 29, extending transverse to the oncoming direction of the pastry pieces proximate to the shaft 27 and provided with projecting lug portions 30, arranged between and below respective of said brush pairs.

In the practice, as said projecting lug portions engage the central zone of the formed confectionery pieces, the brush pairs, by rotating through a revolution and translating relative to the lug portions, engage the two ends of the relative pastry pieces, thereby suitably bending the pastry pieces and fitting them in the related recesses 20 of the baking pan.

These coordinate movements are obtained by mounting the rod 29 on two vertically extending heavy arms 31, having a lower end engaged by a suitably contoured cam 32, and by mounting the shaft 27 on oscillating lever arms 33 pivoted to a small coupling rod 34 eccentrically pivoted to a rotating disk 35.

More specifically, the rotation of the shaft 27 and cam 32 is controlled by a microswitch 36, operated by the cam 37, while a second microswitch 38, operated by a pin or peg mounted on the hub of the driving gear wheel 39, stops rotation of the shaft 27 and cam 32, after a complete revolution, thereby the brushes 28, during the translation movement of the baking pans, are located with their bristles facing upwards. As visible in the drawings, the contour of the cam 32 is such as to timely raise and lower the rod 29.

From the above description and the observation of the several figures of the accompanying drawings, the great functionality and use facility characterizing the improved machine for forming croissants and the like confectionery products are self-evident.

It should be noted that the machine has been hereinabove illustrated and described by way of an indicative and not limitative example only and only to demonstrate its main characteristics and the better way for carrying the invention into effect; thus modifications and variations can be provided without departing from the spirit and scope of the invention.

I claim:

1. A machine for forming croissants and like pastry products, comprising a holding device for temporarily holding a plurality of oncoming rolled up pastry pieces aligned across an oncoming direction, conveyor means for conveying baking pans under said holding device, said baking pans having a plurality of arcuate recesses for said pastry pieces and said holding device having means for causing said pastry pieces to fall onto said baking pans in corresponding relationship with said recesses, and a bending station arranged downstream of said holding device and having means for arcuately bending said pastry pieces to be received in said recesses of said baking pans, wherein said means for bending said pastry pieces comprise a shaft extending transverse to said oncoming direction of said pastry pieces, pairs of brushes arranged spaced apart from one another on said shaft, a rod extending transverse to said oncoming direction proximate to said shaft, a plurality of projecting lug portions provided on said rod such that each of said lug portions is arrnged between and below a respective one of said pairs of brushes, and means for rotating said shaft and translating said shaft relative to said lug portions for causing the brushes of each pair to bend a respective one of said pastry pieces when centrally engaged by a respective one of said lug portions.

2. A machine as claimed in claim 1, wherein said brushes have each a semicircular arrangement of bristles and said shaft is stopped with said bristles facing upwards during translation movement of said baking pans under said pairs of brushes.

3. A machine as claimed in claim 1, wherein said means for translating said shaft comprise oscillating arms supporting said shaft, and wherein said means for rotating said shaft comprise a cam-operated microswitch for controlling rotation of said shaft such that rotation is stopped after a complete revolution of said pairs of brushes.

4. A machine as claimed in claim 1, further comprising vertically extending arms supporting said rod, and a cam engaging a lower end of said arms for timely raising and lowering said rod.

5. A machine as claimed in claim 1, wherein said means for causing said pastry pieces to fall onto said baking pans comprise two elongated rectangular plates each having end pins rotatably supported parallel to one another, said plates being rotatable between a position in which they converge downwardly to hold said oncoming pastry pieces and a position in which they lie vertically and parallel to one another to cause said pastry pieces to fall onto said baking pans.

6. A machine as claimed in claim 5, further comprising pinion gears rigid with two adjacent of said pins, said pinion gears meshing with one another, one of said pinion gears having a thickness greater than the other of said pinion gears, a rack engaging said one of said pinion gears, a pin member on one end of said rack, and a cam profile defined on a face of a rotatable disk member and engaged by said pin member for reciprocating said rack and causing said plates to move between said positions.

* * * * *